March 10, 1970 YASUAKI WATANABE ET AL 3,499,974
FIELD SEQUENTIAL COLOR VIDEO SIGNAL RECORDING AND REPRODUCING SYSTEM WITH COLOR FIELD SYNCHRONIZING SIGNAL
Filed Jan. 10, 1966

INVENTORS
YASUAKI WATANABE
TADANORI OHTSU
MASAHIKO NAGANO

BY

Louis Bernat ATTORNEY 3,499,974
Patented Mar. 10, 1970

3,499,974

FIELD SEQUENTIAL COLOR VIDEO SIGNAL RECORDING AND REPRODUCING SYSTEM WITH COLOR FIELD SYNCHRONIZING SIGNAL

Yasuaki Watanabe, Chigasaki, Tadanori Ohtsu, Yokohama, and Masahiko Nagano, Tokyo, Japan, assignors to Victor Company of Japan, Limited, Yokohama, Japan, a Japanese corporation Filed Jan. 10, 1966, Ser. No. 519,781
Claims priority, application Japan, Jan. 14, 1965, 40/578
Int. Cl. H04n 1/46, 9/12
U.S. Cl. 178—5.2 10 Claims

ABSTRACT OF THE DISCLOSURE

A magnetic recording system for recording and reproducing a field sequential color video signal. This signal is a composite of a color video information signal, a vertical synchronizing signal, a horizontal synchronizing signal, and a color synchronizing signal. This composite signal is recorded on a first portion of a magnetic medium. A color synchronizing signal is recorded on a second portion of the magnetic medium which is separate from the first portion. When the composite signal is played back, a pulse signal is produced from the reproduced color synchronizing signal and the reproduced composite signal. These pulses recur as a reproduced color synchronizing signal, in pulse repetition rate and in phase with the reproduced vertical synchronizing signal.

Figure 1:
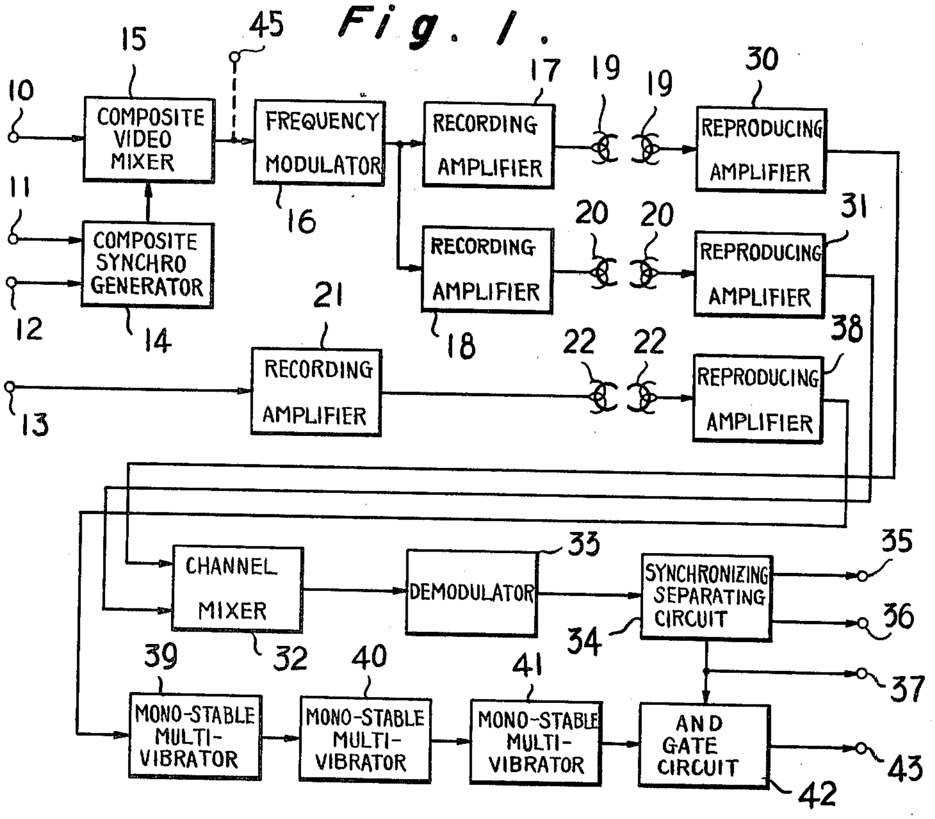

This invention relates to a system for magnetic recording and reproducing of a field sequential color video signal, and more particularly to a system operative to record and reproduce a field sequential color video signal with a high degree of fidelity and stability, without jitter effects, and without being affected by noise or variations in operating conditions.

Systems for magnetic recording and reproducing of field sequential color video signals are known wherein a color video information signal and vertical, horizontal and color synchronizing signals are combined and recorded together on the magnetic medium. In such systems, the horizontal, vertical and color synchronizing signals must be separated out from the reproduced composite signal. Various instabilities are encountered with such prior art systems, producing jitter effects and other objectionable distortions in the picture developed from the reproduced signals.

It has been found that the instabilities so produced arise from the fact that the color synchronizing signal is in the form of a micro pulse of short duration. The attempted separation of the color synchronizing signal from the reproduced composite signal is quite difficult, and separation is adversely affected by noise and the like.

The general object of this invention is to overcome the disadvantages of prior systems for recording and reproducing a field sequential color video signal with a high degree of stability and fidelity.

A more specific object of the invention is to provide a system for recording and reproducing a field sequential color video signal wherein the color synchronizing signal is reliably developed with high stability and without phase variations.

A further object of the invention is to provide an inexpensive system for recording and reproducing a field sequential color video signal with a high degree of stability and fidelity but with circuit arrangements which are comparatively simple and straightforward in construction and operation.

According to this invention, the color video information signal is recorded on a first portion of a magnetic medium. Preferably, recording is by means of two or more magnetic heads sequentially engaged with the magnetic medium. A color synchronizing signal is recorded on a separate portion of the magnetic medium, preferably by means of an additional magnetic head engageable with an edge portion of a magnetic tape or other medium. With this system, it is possible to reproduce the color synchronizing signal with a high degree of stability and reliability, and to avoid the disadvantages of prior systems.

In accordance with another feature of the invention, mixer means are provided for combining the color information signal and the vertical and horizontal synchronizing signals to produce a composite signal which is recorded on the first portion of the magnetic medium. Means are provided for separating out the vertical and horizontal synchronizing signals from the reproduced composite signal.

Another feature of the invention is in the provision of an AND gate in the reproducing portion of the system. The gate is enabled responsive to a gating signal produced from the reproduced color synchronizing signal and to a reproduced vertical synchronizing signal. With this feature, the effects of phase shifts such as produced by unavoidable variations in the speed of the magnetic heads are substantially obviated.

Figure 3:
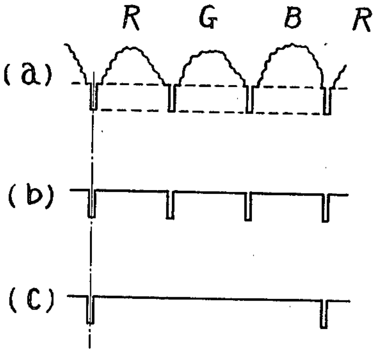
Figure 2:
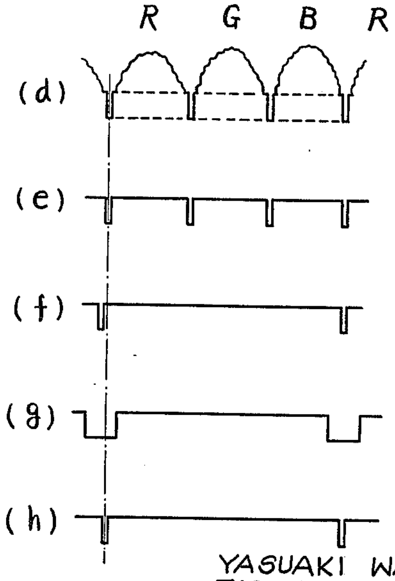

This invention contemplates other and more specific objects, features and advantages which will become more fully apparent from the following detailed description taken in conjunction with the accompanying drawings which illustrate a preferred embodiment and in which:

FIGURE 1 is a schematic block diagram showing a system for recording and reproducing a field sequential color video signal, constructed in accordance with the invention;

FIGURES 2(*a*)–(*c*) are wave form diagrams showing the time relation of recorded signals; and FIGURES 3(*d*)–(*h*) are wave form diagrams showing the time relation of reproduced signals.

Referring to FIGURE 1, signals obtained from a field sequential color image pick-up device or television camera are applied to input terminals 10, 11, 12 and 13. A color video information signal is applied to the terminal 10 while horizontal and vertical synchronizing signals are applied to terminals 11 and 12. A color synchronizing signal is applied to terminal 13. In a system in which three color signals are developed in sequence, such as red, green and blue signals, the color synchronizing signal applied to terminal 13 has a frequency equal to one-third the frequency of the vertical synchronizing signal applied to terminal 12.

The horizontal and vertical synchronizing signals applied to terminals 11 and 12 are combined by a composite synchronizing signal generator 14. The output of generator 14 is applied to a composite video mixer circuit 15 along with the color video information signal applied to input terminal 10.

A composite video signal is developed having a wave form such as illustrated in FIGURE 2(*a*), wherein only the vertical synchronizing signal portion and video information signal portions are depicted. The horizontal synchronizing signals occur at a relatively high rate, as will be understood by those skilled in the art. FIGURE 2(*b*) illustrates a form of the vertical synchronizing signal applied to input terminal 12, while FIGURE 2(*c*) illustrates a form of the color synchronizing signal applied to terminal 13, with a frequency equal to one-third the frequency of the vertical synchronizing signal.

The composite video signal developed by the mixer circuit 15 is applied to a frequency modulator circuit 16 to develop a signal which is applied through recording amplifiers 17 and 18 to a pair of magnetic heads 19 and 20. The magnetic heads 19 and 20 may preferably be fixed to the periphery of a rotatable disk at positions spaced 180° apart. These heads sequentially engage a magnetic tape in a manner as is well known in the art and therefore not illustrated.

In accordance with this invention, the color synchronizing signal from input terminal 13 is applied through a recording amplifier 21 to a magnetic head 22. This head is operative to record on a portion of the magnetic medium separate from that portion which is engaged by the magnetic heads 19 and 20. Preferably, the magnetic head 22 is fixed and engages a longitudinal edge portion of a magnetic tape. The central portion of the tape is engaged by the rotatable magnetic heads 19 and 20.

The same magnetic heads are preferably used for reproducing or playback. The signals developed by the heads 19 and 20 are applied through reproducing amplifiers 30 and 31 to a channel mixer circuit 32. The output of circuit 32 is applied to a demodulator circuit 33 which is operative to produce a composite video signal corresponding to that developed by the composite video mixer circuit 15. The reproduced composite signal from demodulator 33 is applied to a synchronizing signal separating circuit 34 which develops the color information signal at a terminal 35, a horizontal synchronizing signal at a terminal 36, and a vertical synchronizing signal at a terminal 37.

FIGURE 3(d) shows the wave form at the output of the demodulator 33. FIGURE 3(e) shows the reproduced and separated vertical synchronizing signal produced at the terminal 37.

The reproduced color synchronizing signal is produced by the head 22 and applied to a reproducing amplifier 38. A first monostable multivibrator 39 is driven by the output of amplifier 38 to develop a pulse of a certain duration. The output of circuit 39 is applied to a second monostable multivibrator 40 which in turn develops a pulse applied to a third monostable multivibrator 41. The output of the third monostable multivibrator 41 is applied to one input of an AND gate circuit 42. A second AND gate input is connected to the output of the vertical synchronizing signal separating circuit 34. The AND gate output is connected to an output terminal 43.

In operation, the monostable multivibrators 39 and 40 function as a phase shifting circuit to trigger the monostable multivibrator 41 at a time somewhat in advance of the vertical synchronizing signal developed from the circuit 34. The monostable multivibrator 41 develops a pulse having a duration such that the trailing edge thereof occurs after a separated vertical synchronizing pulse appears at the output of the circuit 34. Thus, in response to a reproduced color synchronizing signal as depicted in FIGURE 3(f), a gate signal is developed by the monostable multivibrator 41, as depicted in FIGURE 3(g).

When such signals are applied to the gate circuit 42, a resultant signal is produced as depicted in FIGURE 3(h). This resultant signal is in properly phase-locked relation to the reproduced color information signal applied to terminal 35. This will be true, regardless of the variations in the feed of the magnetic medium and in the velocity of the movement of the magnetic heads relative to the magnetic tape. As a result, a color picture is produced with a high degree of fidelity and stability and without the jitter produced in prior systems.

It may be noted that, if a composite video signal is available, it may be applied to an input terminal 45 which is connected directly to the input of the frequency modulator 16 as indicated in dotted lines. The need for the composite synchronizing signal generator 14 and composite video mixer circuit 15 is then obviated.

It will be understood that the composite color video signal may be recorded and reproduced using either only one magnetic head, or a plurality of heads, which may be greater than two. It will be further understood that other modifications and variations may be made without departing from the spirit and scope of the novel concepts of this invention.

We claim as our invention:

1. In a magnetic recording system for recording and reproducing a field sequential color video signal including a color video information signal, a vertical synchronizing signal, a horizontal synchronizing signal, and a color synchronizing signal, said system comprising first recording means for recording a composite signal on a first portion of a magnetic medium, said composite signal including said information signal, vertical synchronizing signal, and horizontal synchronizing signal, second recording means for recording said color synchronizing signal on a second portion of the magnetic medium, said second portion being separate from said first portion, first reproducing means for reproducing said composite signal from said first portion of the magnetic medium, second reproducing means for reproducing said color synchronizing signal from said second portion of the magnetic medium, and means for producing a pulse signal from said reproduced color synchronizing signal and said reproduced composite signal, said pulse signal recurring as the reproduced color synchronizing signal in pulse repetition rate and in phase with the reproduced vertical synchronizing signal.

2. In a system as defined in claim 1, a plurality of magnetic heads sequentially engageable with the magnetic medium and forming part of both said first recording means and said first reproducing means, and an additional head forming part of both said second recording means and said second reproducing means.

3. In a system as defined in claim 1, mixer means for combining said information signal and said vertical and horizontal synchronizing signals to produce a composite signal, said first recording means being effective for recording said composite signal on said first portion of the magnetic medium.

4. In a system as defined in claim 1, said means for producing said pulse signal including a synchronizing signal separating means for developing said vertical and horizontal synchronizing signals from the reproduced composite signal.

5. In a system as defined in claim 4, said means for producing a pulse signal including an AND gate circuit having a pair of inputs, means responsive to the reproduced color synchronizing signal for applying a gating signal to one of said inputs, and means for applying the vertical synchronizing signal separated from said composite signal to the other of said inputs.

6. In a system for recording and reproducing, on a magnetic medium, a field sequential color video signal including a color video information signal, a vertical synchronizing signal, a horizontal synchronizing signal, and a color synchronizing signal, said system including first recording means for recording said information signal on a first portion of the magnetic medium, second recording means for recording said color synchronizing signal on a second portion of the magnetic medium separate from said first portion, mixer means for combining said information, vertical, and horizontal synchronizing signals to produce a composite signal, said first recording means being effective for recording said composite signal on said first portion of the magnetic medium, first reproducing means for reproducing said composite signal from said first portion of the magnetic medium, second reproducing means for reproducing said color synchronizing signal from said second portion of the magnetic medium, synchronizing signal separating means for developing said vertical and horizontal synchronizing signals from the reproduced composite signal, an AND gate circuit having a pair of inputs, means responsive to the reproduced color synchronizing signal for applying a gating signal to one of said inputs, and means for applying the vertical synchronizing signal separated from said composite signal to the other of said inputs.

7. In a system for recording and reproducing, on a magnetic medium, a field sequential color video signal including a color video information signal, a vertical synchronizing signal, a horizontal synchronizing signal, and a color synchronizing signal, said system including first recording means for recording said information signal on a first portion of the magnetic medium, second recording means for recording said color synchronizing signal on a second portion of the magnetic medium separate from said first portion, mixer means for combining said information, vertical, and horizontal synchronizing signals to produce a composite signal, said first recording means being effective for recording said composite signal on said first portion of the magnetic medium, first reproducing means for reproducing said composite signal from said first portion of the magnetic medium, second reproducing means for reproducing said color synchronizing signal from said second portion of the magnetic medium, synchronizing signal separating means for developing said vertical and horizontal synchronizing signals from the reproduced composite signal, said vertical synchronizing signal being in the form of pulses having a certain repetition rate and said color synchronizing signal being in the form of pulses synchronized with said vertical synchronizing pulses and having a rate equal to a sub-multiple of said certain rate, and means for producing a pulse signal including gating signal generator means operated responsive to each reproduced color synchronizing pulse for producing a gating pulse starting at a time substantially ahead of and ending at a time substantially after a reproduced vertical synchronizing pulse.

8. In a system as defined in claim 7, said gating signal generator means comprising a monostable multivibrator operative to generate said gating pulse.

9. In a system as defined in claim 8, said gating signal generator means further comprising phase shift means for triggering said monostable multivibrator.

10. In a system as defined in claim 9, said phase shift means comprising a second monostable multivibrator for triggering said gating pulse generating multivibrator, and a third monostable multivibrator triggered by color synchronizing pulses to trigger said second monostable multivibrator.

References Cited

UNITED STATES PATENTS

| | | | |
|---|---|---|---|
| 2,709,717 | 5/1955 | Werenfels ---------- | 178—5.2 |
| 2,976,354 | 3/1961 | Banning. | |
| 3,358,080 | 12/1967 | MacLeod. | |

ROBERT L. GRIFFIN, Primary Examiner

H. W. BRITTON, Assistant Examiner

U.S. Cl. X.R.

178—6.6, 69.5